Figure 1:
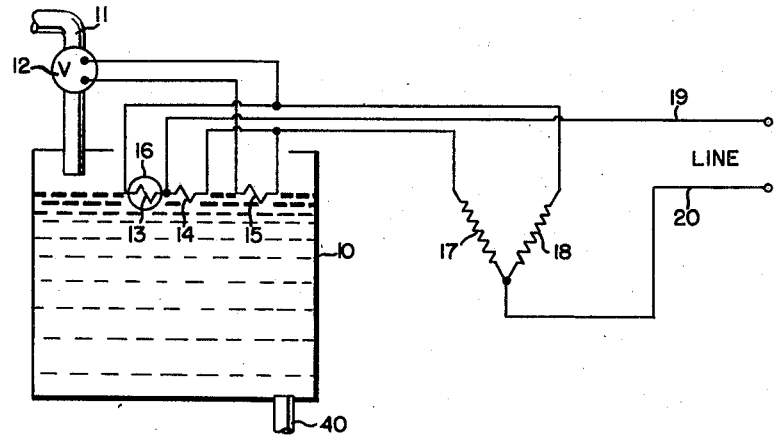

Feb. 18, 1958     D. C. JOHNSTON     2,824,278
LIQUID LEVEL SENSING APPARATUS
Filed Oct. 1, 1954

INVENTOR
DONALD C. JOHNSTON

BY *George H. Fisher*

ATTORNEY

United States Patent Office 2,824,278
Patented Feb. 18, 1958

2,824,278

LIQUID LEVEL SENSING APPARATUS

Donald C. Johnston, Richfield, Minn., assignor to Minneapolis-Honeywell Regulator Company, Minneapolis, Minn., a corporation of Delaware Application October 1, 1954, Serial No. 459,702

8 Claims. (Cl. 323—69)

This invention relates generally to control apparatus and more particularly to liquid level sensing apparatus utilizing negative temperature coefficient resistance means.

It is well known that a temperature sensitive resistance means can be used to sense the presence or absence of a liquid. This is possible since the resistance of the temperature sensitive resistance means is determined by the temperature thereof and the temperature thereof varies in accordance with the heat conducting quality of the medium in which it is placed. For example, air will conduct heat away from the negative temperature coefficient resistor in a slight amount compared to a fluid such as gasoline. Therefore, there is an abrupt change in resistance of the resistance means when the resistance means, previously in air, is submerged in a fluid, both of which may have the same ambient temperature.

In the apparatus as above described it is common practice to provide ambient temperature compensation means by including a second negative temperature coefficient resistance means. This second resistance means can be shielded from direct contact with the medium, such as liquid, directly surrounding the first resistance means and in this manner the second resistance means is subject to the ambient temperature of the liquid but is not cooled in varying amounts according to the rate at which the liquid surrounding the shield can conduct the heat away from the resistance means. The second resistance means could also be unshielded but located so as to be subjected to ambient temperature but not subject to direct contact with the liquid surrounding the first resistance means.

It is often desirable to connect the two above mentioned resistance means in bridge circuit such as a Wheatstone bridge circuit with the resistance means being in adjacent legs thereof and the resistances proportioned so as to unbalance the bridge circuit when the liquid surrounds both resistance means. When this is done however difficulty has been encountered where the resistance means are subjected to a relatively cold medium. The relatively cold medium tends to increase the resistance of both the first and second above mentioned temperature responsive means. However, one of the resistance means tends to heat up to operating temperature before the other. This reduces the resistance of the one resistance means and substantially short circuits the other resistance means through the detecting branch of the bridge thus rendering the bridge inoperative. Or in other words, the bridge reaches such a condition that it can never become balanced, and therefore, is ineffective to differentiate as to whether the sensor thereof is surrounded by liquid or air and thus does not satisfy the requirements of a liquid level sensing apparatus. This is especially true where a low impedance detector is placed in the detecting branch of the Wheatstone bridge. It is of course recognized that it is desirable to match the impedance of the detector to the low output impedance of the bridge for maximum power transfer.

It is therefore an object of the present invention to provide means to prevent the above described short circuiting of the resistance means.

It is a further object of the present invention to provide temperature sensitive resistance means in the detecting branch of the Wheatstone bridge to prevent the above described short circuiting of one leg of the bridge.

It is a further object of the present invention to provide three temperature sensitive resistance means which are arranged to be located in a liquid storage container and one of which is shielded to be responsive only to the ambient temperature of the liquid, with means connecting the three temperature responsive resistance means in a Wheatstone bridge circuit with the shielded resistance means and the second resistance means in adjacent legs thereof and with the third resistance means in the detecting branch thereof to prevent short circuiting of the unshielded resistance means when relatively cold liquid is placed in the container.

It is a further object of the present invention to provide a control apparatus for use with a fluid storage container and utilizing a shielded and an unshielded resistance means in adjacent legs of a Wheatstone bridge with a resistor shunted by a bimetal actuated switch located in the detecting branch of the bridge.

Figure 2:
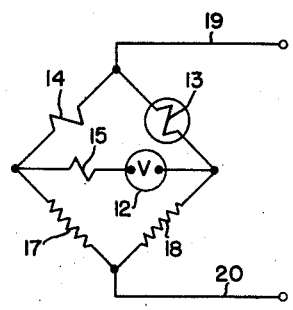
Figure 3:
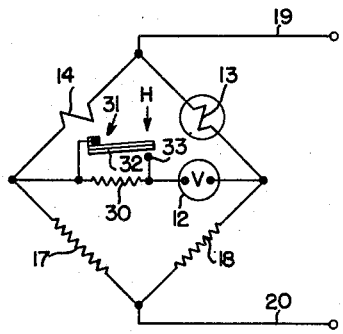

These and other objects of the present invention will become apparent to those skilled in the art upon reference to the specification, claims and drawings, of which Figure 1 is a schematic representation of the improved control apparatus associated with a fluid storage means, Figure 2 is a simplified schematic showing of the apparatus of Figure 1, and Figure 3 is a showing of a modification of the invention.

The present invention utilizes resistance means which is temperature sensitive and has a negative temperature coefficient of resistance, that is, a resistance means which has a relatively high resistance when the resistance means is relatively cold and whose resistance decreases as the temperature of the resistance means increases. A negative temperature coefficient thermistor is a device of this type.

The resistance of a temperature sensitive resistance means is controlled by the temperature of the medium surrounding the resistance means and by the rate at which the medium can conduct heat away from the resistance means. If the resistance means is shielded or insulated from direct contact with the medium, the resistance of the resistance means is an indication of the ambient temperature of the medium. An unshielded temperature sensitive resistance means can be used to determine if air or liquid, both of which may be at the same temperature, surrounds the resistance means. If air, or other gas, surrounds the resistance means the temperature will be relatively high since the air or gas does not readily conduct heat away from the resistance means. However, if liquid surrounds the resistance means, the temperature of the resistance means will be lower since the liquid conducts heat away from the resistance means to a greater extent.

These principles are utilized in the present invention. Referring specifically to Figure 1, the reference numeral 10 designates a fluid storage container which may be a fuel storage tank located in an aircraft and from which fuel is fed to the aircraft engines through outlet 40. An inlet pipe 11 is shown through which fuel can be fed to the tank 10 through a valve assembly 12. Valve assembly 12 is of the type which cuts off the flow of fuel through pipe 11 when the valve 12 is energized. Located at a predetermined level in the tank 10 are three temperature sensitive resistance means having negative temperature coefficients of resistance and designated by the reference numerals 13, 14 and 15. The resistance means 13, 14 and 15 can be designated as the reference, sensing, and compensation thermistors respectively.

The function of the embodiment of Figure 1 is to energize valve 12 when the container 10 has been filled to the predetermined level. It should be noted that it is within the teaching of the present invention to provide the function of opening a valve upon the liquid level dropping to a predetermined level.

The three resistance means have been shown as thermistors and thermistor 13 has been shown to be surrounded by a shield or insulation 16 which prevents thermistor 13 from being subjected directly to the medium which surrounds thermistors 14 and 15. Thermistors 13, 14, and 15 are connected to the valve 12 and to resistors 17 and 18, this connection forming a Wheatstone bridge. Electrical power is supplied to the Wheatstone bridge from the power line conductors 19 and 20.

The arrangement of the Wheatstone bridge is shown more clearly in Figure 2 where it can be seen that the thermistors 13 and 14 are connected in adjacent legs thereof and the thermistor 15 is connected in the detecting branch of the bridge in series with the valve 12. In the embodiment shown, the bridge is unbalanced to energize valve 12 when the fuel covers the thermistors 13, 14, and 15. As noted previously, energization of valve 12 cuts off the flow of fuel through the pipe 11.

It is of course desirable at all times to obtain the maximum power output from the Wheatstone bridge. This necessitates that the impedance of the detecting branch of the bridge be relatively low. The present invention can perhaps be best considered by considering the operation of the Wheatstone bridge of Figure 2 without the thermistor 15. Assuming that the thermistors 13 and 14 are relatively cold, when power is supplied to the conductors 19 and 20, one of the thermistors 13 or 14 will start to heat before the other. For example, thermistor 13 may start to heat due to current flow through it. As this thermistor heats its resistance lowers and even more current flows through the thermistor, causing its temperature to rise still further and its resistance to drop. The effect is to substantially short circuit thermistor 14 through low impedance valve 12 and thereby prevent thermistor 14 from reaching operating temperature. This renders the bridge circuit inoperative, that is, the bridge is unbalanced in such a manner that it is not capable of differentiating whether the sensor thereof is surrounded by liquid or air. For example, when relatively cold fuel is supplied to the tank 10, the fuel will fill the tank until the predetermined level at which the thermistors are located is reached. The thermistor 14 is directly subjected to the greater heat conducting properties of the gasoline whereas thermistor 13 is subjected only to the ambient temperature of the gasoline. Upon power being supplied to the conductors 19 and 20, the resistance of both thermistors increases, however, the resistance of thermistor 14 increases an additional amount since it is subjected to the greater heat conducting property of the gasoline. Thermistor 13 is shielded from the greater heat conducting property of the gasoline and its resistance increases only due to the ambient temperature of the gasoline. The increased resistance of thermistor 14 causes increased current to flow through thermistor 13 additionally heating thermistor 13. This can be seen by considering the current flow circuits through thermistor 13. A first circuit exists directly from power line conductor 19 through thermistor 13, and resistor 18 to power line conductor 20. A second circuit exists through power line conductor 19, thermistor 13, low impedance valve 12, and resistor 17 to power line conductor 20 it being remembered that the bridge circuit is being considered without thermistor 15. Due to the high resistance of thermistor 14, very little current flows through the circuit which can be traced from power line conductor 19 through thermistor 14, and resistor 17 to power line conductor 20. Therefore, thermistor 14 is not heated to any great extent by the current flow therethrough. The increased current through thermistor 13 causes the temperature of thermistor 13 to rise or at least prevents, to a great extent, a drop in temperature of the thermistor 13 so that its resistance remains relatively low and the circuit consisting of thermistor 13 and the low impedance valve 12 substantially short circuits the thermistor 14. The bridge is then rendered inoperative. Or in other words, the bridge is unbalanced in such a manner that the sensor thereof cannot differentiate whether it is surrounded by liquid or air, thereby destroying the apparatus' function as a liquid level sensing apparatus.

However, use of the thermistor 15 in the detecting branch of the Wheatstone bridge of Figure 1 prevents the bridge from being rendered inoperative by the short circuiting of thermistor 14. As above discussed, the thermistor 15 is directly exposed to the greater heat conducting properties of the gasoline when the gasoline reaches the predetermined height in tank 10. Therefore, the resistance of both thermistors 14 and 15 increases in the same manner, that is, the impedance of the detecting branch of the bridge becomes high as the impedance of thermistor 14 increases. This increases the resistance of the circuit from thermistor 13 through the low impedance valve 12 and prevents the short circuiting of thermistor 14, as above described.

In this way, while the current flow through thermistor 13 is decreased and the current flow through thermistor 14 is increased, still thermistor 14 is no longer substantially short circuited. After a short time period of operation the thermistors 13, 14 and 15 reach operating temperature and the bridge is balanced and valve 12 is actuated to cut off the flow of gasoline to the tank 10.

Figure 3 is a showing of a modification of the present invention wherein the thermistor 15 is replaced by a temperature sensitive resistance means including a resistor 30 shunted by a bimetal actuated switch 31. The bimetal actuated switch 31 is placed at the same level in the container 10 as is the thermistor 15 of Figure 1. Therefore, the bimetal actuated switch 31 is cooled by the gasoline when the gasoline reaches the predetermined level in the tank 10. As indicated by the arrow in Figure 3, a bimetal 32 of the bimetal actuated switch moves in a downward direction when its temperature is increased and makes contact with a stationary contact 33 thereby shorting out resistor 30 and lowering the resistance of the detecting branch of the bridge. In the cold condition, the resistance of the detecting branch of the bridge is increased to prevent the substantial short circuiting of the thermistor 14 as above described.

While a valve has been shown in the detecting branch of the bridge, it is to be understood that any voltage or current responsive means, such as an indicator, a light, or a relay, can be substituted for the valve.

These and other modifications of the present invention will be apparent to those skilled in the art and it is intended that the scope of the present invention be limited solely by the appended claims of which I claim as my invention:

1. Control apparatus comprising, a bridge network having a reference negative temperature coefficient impedance which is shielded so as to be affected only by ambient temperature and having an unshielded sensing negative temperature coefficient impedance, said impedances being connected in adjacent legs of the bridge network, each of said impedances being mounted so as to be subjected each to the temperature at a given position, and an unshielded compensation negative temperature coefficient impedance connected in the detecting branch of the bridge network and subjected to the common temperature.

2. Fluid level sensing control apparatus for use with a fluid container comprising, a first impedance having a negative temperature coefficient, a second impedance having a negative temperature coefficient, said first impedance being shielded so as to be affected only by ambient temperature, said first and second impedances being arranged to be positioned in the container at substantially the same level, a further impedance having a negative temperature coefficient, said further impedance being arranged to be positioned in the container, means connecting said first and second impedances and said further impedance in a Wheatstone bridge circuit with said further impedance in the detecting branch thereof.

3. In combination, a container for storing a fluid, first, second, and third temperature sensitive resistance means having a higher resistance when cold than when hot, means arranged to shield said first resistance means from direct contact with the fluid so that the temperature of the first resistance means is affected only by the ambient temperature of the fluid, said first and second resistance means being arranged to be mounted substantially at the same level in said container and said third resistance means being arranged to be positioned in the fluid in said container, and means connecting said three temperature sensitive means in a Wheatstone bridge with the first and second temperature sensitive resistance means in adjacent legs thereof and with the third temperature sensitive means in the detecting branch thereof.

4. Fluid level sensing control apparatus for use with a container of fluid, comprising; first, second, and third negative temperature coefficient resistances, each of which are arranged to be positioned at a given level within the container, said first resistance being shielded from direct contact with the fluid so that its temperature is affected only by the ambient temperature of the fluid and said second and third resistances being unshielded so that the temperature thereof is reduced due to the cooling qualities of the fluid, and means connecting said first, second, and third resistances in a Wheatstone bridge with said first and second resistances located in adjacent legs thereof and with said third resistance located in the detecting branch thereof.

5. In combination; a fluid container, three negative temperature coefficient thermistors arranged to be positioned at a given level in said container, shielding means associated with a first of said thermistors so that the temperature thereof is affected only by the ambient temperature of the fluid when fluid exists at the given level, said second and third of said thermistors being exposed to fluid when fluid exists at the given level and being cooled by the fluid conducting heat away from the second and third thermistors, means connecting said first and second of said thermistors in different portions of a bridge circuit, and means connecting said third thermistor in the detecting branch of the bridge.

6. Control apparatus comprising, a Wheatstone bridge having a first and a second negative temperature coefficient thermistor in adjacent legs thereof and arranged to be positioned at a given level in a container of fluid, means shielding said first thermistor from direct contact with the fluid so that said second thermistor is cooled to a greater extent by the fluid than is said first thermistor, and resistance means including a temperature responsive switch, means connecting said resistance means in the detection branch of said bridge to prevent said second thermistor from substantially short circuiting said first thermistor due to cold fluid.

7. Liquid level sensing apparatus for use with a container of liquid, comprising, three temperature sensitive resistance means arranged to be positioned at a predetermined level in the container and having a higher resistance when cold than when hot, a first of said resistance means being enclosed so that it is affected only by the ambient temperature of the medium surrounding it, the second and third of said resistance means being directly subjected to the liquid when liquid exists at the predetermined level and having the temperature thereof affected by the rate at which the medium surrounding the second and third resistance means conducts heat away from said resistance means, means connecting said first and second resistance means in adjacent legs of a bridge, and means connecting said third resistance means in the detecting branch of the bridge.

8. In combination, a liquid storage container, three temperature responsive resistance means positioned at a predetermined level in said container and having a relatively high resistance when relatively cold, means insulating a first of said resistance means to prevent direct transmission of heat to the medium surrounding said first resistance means while allowing said first resistance means to be affected by the ambient temperature of the medium, the second and third of said resistance means being directly exposed to the medium to be affected by the rate at which the medium can conduct heat away from said second and third resistance means, means connecting said first and second resistance means in adjacent legs of a bridge so that the current flow in said legs is determined by the relative resistance of said first and second resistance means, and means connecting said third resistance means in a detection branch of the bridge.

References Cited in the file of this patent

UNITED STATES PATENTS

| | | |
|---|---|---|
| 2,246,563 | Winters | June 24, 1941 |
| 2,570,451 | Hottenroth | Oct. 9, 1951 |
| 2,580,016 | Gilbert | Dec. 25, 1951 |
| 2,632,885 | Barclay | Mar. 24, 1953 |
| 2,667,178 | Fred | Jan. 26, 1954 |

FOREIGN PATENTS

| | | |
|---|---|---|
| 1,197/31 | Australia | Mar. 16, 1931 |